United States Patent [19]
Qi et al.

[11] Patent Number: 5,863,308
[45] Date of Patent: Jan. 26, 1999

[54] LOW TEMPERATURE BOND FOR ABRASIVE TOOLS

[75] Inventors: Dongxin Qi, Shanghai, China; Robert S. Lundberg, Charlton City, Mass.

[73] Assignee: Norton Company, Worcester, Mass.

[21] Appl. No.: 962,482

[22] Filed: Oct. 31, 1997

[51] Int. Cl.⁶ .................................................... B24D 3/02
[52] U.S. Cl. ............................... 51/309; 51/293; 51/307; 501/66; 501/69; 501/77
[58] Field of Search ............................. 51/293, 307, 309; 501/66, 69, 77

[56] References Cited

U.S. PATENT DOCUMENTS

| | | | |
|---|---|---|---|
| 2,309,463 | 1/1943 | Lombard et al. | 51/393 |
| 2,343,218 | 2/1944 | Lombard | 51/307 |
| 2,356,937 | 8/1944 | Lombard | 51/307 |
| 3,892,581 | 7/1975 | Burgman et al. | 106/50 |
| 4,259,118 | 3/1981 | Sack | 106/54 |
| 4,792,535 | 12/1988 | Fine | 501/66 |
| 4,898,597 | 2/1990 | Hay et al. | 51/298 |
| 4,925,814 | 5/1990 | Fine | 501/66 |
| 4,997,461 | 3/1991 | Markhoff-Matheny et al. | 51/295 |
| 5,035,723 | 7/1991 | Kalinowski et al. | 51/309 |
| 5,064,784 | 11/1991 | Saito et al. | 501/33 |
| 5,094,672 | 3/1992 | Giles, Jr. et al. | 51/309 |
| 5,095,665 | 3/1992 | Nagata et al. | 51/307 |
| 5,118,326 | 6/1992 | Lee et al. | 51/309 |
| 5,129,919 | 7/1992 | Kalinowski et al. | 51/309 |
| 5,131,923 | 7/1992 | Markhoff-Matheny et al. | 51/293 |
| 5,256,603 | 10/1993 | Andrus et al. | 51/309 |
| 5,268,335 | 12/1993 | Kerko et al. | 501/66 |
| 5,401,284 | 3/1995 | Sheldon et al. | 51/308 |
| 5,536,283 | 7/1996 | Sheldon et al. | 51/308 |
| 5,744,409 | 4/1998 | Hashimoto et al. | 501/77 |

FOREIGN PATENT DOCUMENTS

| | | | |
|---|---|---|---|
| 0211247 | 7/1986 | European Pat. Off. | B24D 3/18 |
| 458427 | 3/1975 | U.S.S.R. | B24D 3/14 |
| 1168397 | 8/1983 | U.S.S.R. | B24D 3/14 |
| 2143515 | 2/1985 | United Kingdom | C04B 35/10 |

OTHER PUBLICATIONS

"Composition of Lithium Aluminoborosilicate Glass and Abrasive", P.V. Ebeling, A.N. Krasnov, V.D. Khaliev, Glass and Ceramics, V53, N3–4 (Mar.–Apr.), pp. 88–91, New York, 1996.

*Primary Examiner*—Deborah Jones
*Attorney, Agent, or Firm*—Mary E. Porter

[57] ABSTRACT

The present invention provides a vitreous-bonded abrasive tool wherein the abrasive grit portion comprises a thermally sensitive abrasive grain, such as sintered sol gel microcrystalline alpha alumina abrasive grain or superabrasive grain, and wherein the vitrified bond may be matured by firing at a temperature below about 875° C. The invention further includes a novel vitrified bond composition.

23 Claims, No Drawings

LOW TEMPERATURE BOND FOR ABRASIVE TOOLS

BACKGROUND OF THE INVENTION

The invention relates to abrasive tools, particularly vitrified abrasive wheels made with a low temperature bond and containing sintered sol gel alumina abrasive grain. The abrasive tools are characterized by improved resistance to grain degradation from bond firing during manufacture of the tools. The invention further includes a vitrified bond composition suitable for firing at relatively low temperatures such as 600°–875° C.

Abrasive tools comprising seeded or unseeded sintered sol gel alumina abrasive grain, also referred to microcrystalline alpha-alumina (MCA) abrasive grain, are known to provide superior grinding performance on a variety of materials. The manufacture and characteristics of these MCA grains and the performance of these MCA grains in various applications are described in, for example, U.S. Pat. Nos. 4,623,364, 4,314,827, 4,744,802, 4,898,597 and 4,543,107, the contents of which are hereby incorporated by reference.

Vitreous or glass bonded abrasive tools containing MCA grain are commercially useful for grinding precision metal parts and other industrial components requiring consistent and improved grinding performance. To produce these types of abrasive tools with consistent quality, reactions between glass bond components and the MCA grain at typical temperatures encountered during firing of the bond, e.g., 1100°–1400° C. must be avoided. Controlling these reactions minimizes damage to the critical microcrystalline structure of the grain.

To reduce the amount of reaction between MCA grain and vitrified bond, U.S. Pat. No. 4,543,107 discloses a bond composition suitable for firing at a temperature as low as about 900° C. In an alternate approach, U.S. Pat. No. 4,898,597 discloses a bond composition comprising at least 40% fritted materials suitable for firing at a temperature as low as about 900° C. In certain grinding applications these low temperature bonds have demonstrated insufficient mechanical strength to meet commercial objectives prompting development of stronger bonds.

Vitrified bonds characterized by improved mechanical strength have been disclosed for use with either alumina oxide or MCA (also referred to as sol gel alpha-alumina) abrasive grits in manufacturing grinding wheels having improved form holding properties. Such bonds are described in U.S. Pat. No. 5,203,886, U.S. Pat. No. 5,401,284 and U.S. Pat. No. 5,536,283, which are hereby incorporated by reference. These vitrified bonds may be fired at relatively low temperatures (e.g., about 900°–1100° C.) to avoid reaction with high performance, sintered sol gel alpha-alumina abrasive grain. The wheels made with these bonds and MCA grain have shown excellent performance in finishing precision moving parts, particularly ferrous metal parts.

It has now been discovered that by selecting appropriate material components, suitable bonds may be made and fired at about 600°–875°, preferably 700°–800° C. In particular, by selecting appropriate contents of boron oxide, alkali oxides and alkaline earth oxides, and by maintaining the correct ratios of boron oxide to alkali oxides, sodium oxide to lithium oxide, and silicon oxide to the combination of alkali oxides and alkaline earth oxides in these bonds, and then formulating a wheel comprising this new bond and MCA grain, abrasive tools having improved G-ratio and grinding performance with reduced power draw and acceptable workpiece surface finish can be produced. These tools are an improvement over the low temperature fired, vitrified bonded MCA grain tools previously known in the art.

SUMMARY OF THE INVENTION

The invention is an abrasive tool comprising MCA grain and a novel vitreous bond wherein the vitreous bond after firing comprises less than about 45 mole % $SiO_2$, a maximum of about 15 mole % $Al_2O_3$, from about 24 to about 35 mole % $B_2O_3$, from about 15 to about 30 mole % of alkali oxides comprising at least 5 mole %, on a bond basis, lithium oxide, and the molar ratio of $B_2O_3$ to alkali oxides is from 0.8:1 to 1.7:1. The bond may include alkaline earth oxides. A preferred bond after firing comprises a maximum of 40 mole % $SiO_2$, and the molar ratio of $SiO_2$ to the combined contents of alkali oxides and alkaline earth oxides, if the later are present in the bond, is at least 1.15:1.0.

In the method of the invention, the novel bond may be fired at 600°–875° C., preferably 700°–800° C., to form an abrasive tool having mechanical properties suitable for grinding operations. The abrasive wheel comprises 3 to 25 volume % vitrified bond, 10 to 56 volume % MCA abrasive grain, and, optionally, about 0.1 to about 60 volume % secondary abrasive grains, fillers and adjuncts. The invention further includes an abrasive tool having improved grinding performance, particularly in grinding ferrous precision moving parts.

DESCRIPTION OF THE PREFERRED EMBODIMENTS

The vitrified bonded abrasive tools of the present invention comprise MCA abrasive grain. The MCA or sol-gel alumina grain are preferably produced by either a seeded or an unseeded sol gel process. As used herein, the term "sol-gel alumina grits" are alumina grits made by a process comprising peptizing a sol of an aluminum oxide monohydrate so as to form a gel, drying and firing the gel to sinter it, and then breaking, screening and sizing the sintered gel to form polycrystalline grains made of alpha alumina microcrystals (e.g., at least about 95% alumina).

In addition to the alpha alumina microcrystals, the initial sol may further include up to 15% by weight of spinel, mullite, manganese dioxide, titania, magnesia, rare earth metal oxides, zirconia powder or a zirconia precursor (which can be added in larger amounts, e.g. 40 wt % or more), or other compatible additives or precursors thereof. These additives are often included to modify such properties as fracture toughness, hardness, friability, fracture mechanics, or drying behavior.

Many modifications of alpha alumina sol gel grain have been reported. All grains within this class are suitable for use herein and the term MCA grain is defined to include any grain comprising at least 60% alpha alumina microcrystals having at least 95% theoretical density and a Vickers hardness (500 grams) of at least 18 GPa at 500 grams. The microcrystals typically may range in size from about 0.2 up to about 1.0 microns for seeded grain and from greater than 1.0 to about 5.0 microns for unseeded grain.

Once the gel has formed, it may be shaped by any convenient method such as pressing, molding or extrusion and then carefully dried to produce an uncracked body of the desired shape.

The gel can be shaped and cut into suitable sizes for firing or simply spread out to any convenient shape and dried, typically at a temperature below the frothing temperature of the gel. Any of several dewatering methods, including solvent extraction, can be used to remove the free water of the gel to form a solid.

After the solid is dried, it can be cut or machined to form a desired shape or crushed or broken by any suitable means, such as a hammer or ball mill, to form particles or grains. Any method for comminuting the solid can be used.

After shaping, the dried gel can then be calcined to remove essentially all volatiles and transform the various components of the grains into ceramics (metal oxides). The dried gel is generally heated until the free water and most of the bound water is removed. The calcined material is then sintered by heating and is held within a suitable temperature range until substantially all of the alumina oxide monohydrate is converted to alpha alumina microcrystals.

As mentioned earlier the sol-gel alumina may either be seeded or unseeded. With seeded sol-gel aluminas, nucleation sites are deliberately introduced into or created insitu in the aluminum oxide monohydrate dispersion. The presence of the nucleating sites in the dispersion lowers the temperature at which alpha alumina is formed and produces an extremely fine crystalline structure.

Suitable seeds are well known in the art. Generally they have a crystal structure and lattice parameters as close as possible to those of alpha alumina. Seeds that may be used include for example particulate alpha alumina, alpha ferric oxide ($Fe_2O_3$), precursors of alpha alumina or alpha ferric oxide which convert respectively to alpha alumina or alpha ferric oxide at a temperature below the temperature at which alumina monohydrate would transform to alpha alumina. These seeds types are, however, given as illustration and not as a limitation. The seed particles to be effective should preferably be submicron in size.

Preferably, if a seeded sol-gel alumina is used, the amount of seed material should not exceed about 10 weight % of the hydrated alumina and there is normally no benefit to amounts in excess of about 5 weight %. If the seed is adequately fine (a surface area of about 60 $m^2$ per gram or more), preferably amounts of from about 0.5 to 10 weight %, more preferably about 1 to 5 weight %, may be used. The seeds may also be added in the form of a precursor which converts to the active seed form at a temperature below that at which alpha alumina is formed.

Unseeded sol-gel alumina abrasive may also be used in some cases. This abrasive can be made by the same process described above except for the introduction of seed particles, sufficient rare earth metal oxides or their precursors may be added to the sol or gel to provide at least about 0.5% by weight and preferably about 1 to 30 % by weight rare earth metal oxide after firing.

The abrasive tools of the invention comprise MCA abrasive grain, a vitrified bond, typically with 35 to 65 volume % porosity in the tool, and, optionally, one or more secondary abrasive grains, fillers and/or additives. The abrasive tools preferably comprise 10 to 56 volume % MCA abrasive grain. The amount of abrasive grain used in the tool and percentage of secondary abrasive may vary widely. The compositions of the abrasive tools of the invention preferably contain a total abrasive grain content from about 34 to about 56 volume %, more preferably from about 40 to about 54 volume %, and most preferably from about 44 to about 52 volume % grain.

The MCA abrasive preferably provides from about 5 to about 100 volume % of the total abrasive grain of the tool and more preferably from about 30 to about 70 volume % of the total abrasive in the tool.

When secondary abrasive grains are used, such abrasive grains preferably provide from about 0.1 to about 95 volume % of the total abrasive grain of the tool, and more preferably, from about 30 to about 70 volume %. The secondary abrasive grains which may be used include, but are not limited to, alumina oxide, silicon carbide, cubic boron nitride, diamond, flint and garnet grains, and combinations thereof.

The compositions of the abrasive tools optionally contain porosity. The compositions of the abrasive tools of the invention preferably contain from about 0.1 to about 68 volume % porosity, more preferably contain from about 28 to about 56 volume %, and most preferably contains from about 30 to about 53 volume %. The porosity is formed by both the natural spacing provided by the natural packing density of the materials and by conventional pore inducing media, including, but not limited to, hollow glass beads, ground walnut shells, beads of plastic material or organic compounds, foamed glass particles and bubble alumina, and combinations thereof.

The abrasive tools of the present invention are bonded with a vitreous bond. The vitreous bond used contributes significantly to the improved grinding performance of the abrasive tools of the present invention. The raw materials for the bond preferably include Kentucky Ball Clay No. 6, Kaolin, alumina, lithium carbonate, borax pentahydrate or boric acid and soda ash, flint and wollastonite. Frits may be used in addition to the raw materials or in lieu of the raw materials. These bond materials in combination preferably contain the following oxides: $SiO_2$, $Al_2O_3$, $Na_2O$, $Li_2O$, and $B_2O_3$. In addition alkaline earth oxides, such as CaO, MgO and BaO, are frequently present.

The composition of the abrasive wheel preferably contains from about 3 to about 25 volume % bond, more preferably contains from about 4 to about 20 volume % bond, and most preferably contains from about 5 to about 18.5 volume % bond.

The bond after firing contains less than about 40 weight % $SiO_2$, preferably from about 31 to about 38 weight % $SiO_2$, and more preferably from about 32 to about 37 weight % $SiO_2$; less than about 17 weight % $Al_2O_3$, preferably from about 13 to about 16 weight % $Al_2O_3$, and more preferably from about 14 to about 16 weight % $Al_2O_3$; greater than about 2.5 weight % $Li_2O$, preferably from about 3.5 to about 10.0 weight % $Li_2O$, more preferably from about 3.5 to about 5.0 weight % $Li_2O$, and most preferably from about 3.5 to about 4.7 weight % $Li_2O$; greater than about 20 weight % $B_2O_3$, preferably from about 22 to about 35 weight % $B_2O_3$, and more preferably from about 24 to about 33 weight % $B_2O_3$. In most bonds of the invention, alkali oxides include, on a bond weight % basis, from about 10 to about 16 weight % $Na_2O$, and more preferably from about 11 to about 15 weight % $Na_2O$; and minor amounts, e.g., about 0.06 to 0.15 weight %, of $K_2O$. Cobalt oxide (CoO) and other color sources are not necessary for the invention but may be included where bond color is desirable. Other oxides, such as $Fe_2O_3$, $TiO_2$ and $P_2O_5$, and alkaline earth oxides including CaO, MgO and BaO, exist as impurities in the raw materials and may be present in or added to the bond of the invention, but are not essential in making the bond.

In one embodiment of the invention raw materials are selected to yield up to about 5 weight % CaO, more preferably from about 0.1 to about 4.5 weight % CaO, and most preferably about 0.15 weight % CaO, in the fired bond. Alkaline earth oxides other than CaO are also useful. However, alkaline earth oxides may be used in the bond of the invention only if the vitreous bond after firing comprises a molar ratio of $SiO_2$ to the combined contents of alkaline earth oxides and alkali oxides of at least 1.15:1.0, when the bond comprises a maximum of 40 mole % $SiO_2$. Greater amounts of these combined oxides, relative to the $SiO_2$, cause the bond of the invention to be too soft for many grinding operations. Preferred amounts of alkaline earth oxides are only selected for abrasive tools designed for use in grinding processes where relatively high tool or wheel wear rates are desirable to yield low power draw, or enhanced surface finish or better removal of grinding debris, or other related benefits.

Organic binders are preferably added to powdered bond components, fritted or raw, as molding or processing aids. These binders may include dextrins and other types of glue, a liquid component, such as water or ethylene glycol, viscosity or pH modifiers and mixing aids. Use of binders improves wheel uniformity and the structural quality of the pre-fired or green pressed wheel and the fired wheel. Because the binders are burned out during firing, they do not become part of the finished bond or abrasive tool.

The abrasive wheels may be fired at the relatively low temperatures indicated herein by methods known to those skilled in the art. The firing conditions are primarily determined by the actual bond and abrasives used. The bond is fired at 600° to 875° C., preferably 700° to 800° C., to provide the mechanical properties necessary for grinding metals and other workpieces. The vitrified bonded body further may also be impregnated after firing in a conventional manner with a grinding aid, such as sulfur, or with a vehicle, such as epoxy resin, to carry a grinding aid into the pores of the wheel. The resulting abrasive tools unexpectedly have improved grinding performance relative to tools made with commercial bonds fired at higher temperatures.

The following Examples are provided by way of illustration of the invention, and not by way of limitation.

EXAMPLE 1

Abrasive wheel samples were made for testing and comparing the wheel properties of experimental bonds to those of wheels made with a Norton Company bond used commercially with MCA abrasive grains. The experimental bonds had the prefired compositions shown in Table 3. The powdered glass frits (A or B), obtained from Ferro Corporation, Cleveland, Ohio, which were used in the bonds have the compositions shown in Table 1 below. The chemical compositions of Kentucky No. 6 Ball Clay, sodium silicate, lithium carbonate and wollastonite used in the bonds are given in Table 2.

TABLE 1

Frit Composition (Weight %)

| Oxide (wt %) | Frit A | Frit B |
|---|---|---|
| $SiO_2$ | 58.8 | 54.1 |
| $Al_2O_3$ | 8.6 | |
| $Na_2O$ | 5.3 | 7.7 |
| CaO | 0.2 | |
| $B_2O_3$ | 26.8 | 38.2 |

TABLE 2

Raw Material Composition (Weight %)

| Oxide: | $SiO_2$ | $Al_2O_3$ | CaO | $Na_2O$ | $K_2O$ | $Li_2O$ | $B_2O_3$ | Impur. | Ignition Loss |
|---|---|---|---|---|---|---|---|---|---|
| KBC #6 | 63.8 | 23.1 | 0.1 | 0.2 | 0.4 | | | 3.7 | 8.7 |
| Kaolin | 46.0 | 37.6 | 0.2 | 0.1 | 0.4 | | | 1.5 | 14.2 |
| Alumina | | 99.8 | 0.1 | | | | | 0.1 | |
| Soda Ash | | | | 58.5 | | | | | 41.5 |
| Lithium Carb. | | | | | | 40.1 | | 0.2 | 59.7 |
| Borax 5 Mole | | | | 21.3 | | | 47.8 | | 30.9 |
| Wollastonite | 50.9 | 0.2 | 46.9 | | | | | 0.9 | 1.1 |

TABLE 3

Components of Experimental Bonds

| Component | Bond 1 | Bond 2 | Bond 3 | Bond 4 | Bond 5 | Bond 6 |
|---|---|---|---|---|---|---|
| Kentucky Ball Clay #6 | 1.0 | 1.5 | 0 | 0 | 0 | 0 |
| Kaolin | 32.4 | 28.3 | 22.0 | 37.5 | 11.0 | 14.5 |
| Lithium Carbonate | 7.4 | 9.2 | 6.5 | 7.8 | 7.7 | 9.5 |
| Borax 5 mole | 33.7 | 28.0 | 29.6 | 30.0 | 34.0 | 28.0 |
| Frit A | 3.5 | 18.6 | 17.1 | 9.8 | 13.6 | 17.0 |
| Frit B | 22.0 | 8.0 | 10.9 | 3.3 | 18.4 | 10.8 |
| Soda Ash | 0 | 6.4 | 0 | 4.1 | 0 | 6.8 |
| Alumina | 0 | 0 | 13.9 | 7.5 | 7.8 | 6.0 |
| Wollastonite | 0 | 0 | 0 | 0 | 7.5 | 7.4 |

The bond was produced by dry blending 1,000 g quantities of the raw materials in a plastic container with 10 one inch (2.54 cm) balls on a paint mixer for 15 minutes (30 minutes for bonds 3–6). Preliminary firing tests on pellets made from these bonds confirmed that experimental bonds 1–6 matured into an effective bond at temperatures between 600° and 800° C.

The mole percentage compositions for the fired experimental bonds and a commercial bond used for MCA abrasive grain are shown in Table 4, below

TABLE 4

Mole Percent Compositions of Experimental Bonds

| Experimental Bonds | SiO2 | Al2O3 | B2O3 | NaO2 | Li2O | K2O | CaO |
|---|---|---|---|---|---|---|---|
| Bond 1 | 39.72 | 10.08 | 29.57 | 11.87 | 8.03 | 0.12 | 0.13 |
| Bond 2 | 39.44 | 10.00 | 24.92 | 14.83 | 10.00 | 0.11 | 0.16 |
| Bond 3 | 35.60 | 18.99 | 26.95 | 10.70 | 7.15 | 0.08 | 0.14 |
| Bond 4 | 35.44 | 18.88 | 22.47 | 13.31 | 8.98 | 0.14 | 0.18 |
| Bond 5 | 34.78 | 10.01 | 30.09 | 11.81 | 8.04 | 0.04 | 4.97 |
| Bond 6 | 34.58 | 10.01 | 25.03 | 14.92 | 10.07 | 0.05 | 5.00 |
| Commercial Bond 1 | 51.28 | 11.61 | 17.79 | 10.12 | 3.94 | 2.04 | 1.72 |

The bonds were combined with an MCA abrasive grain, Norton Company Targa® 120 grit abrasive seeded sol-gel alumina grain (filamentary particles with an aspect ratio of about 4:1) made according to U.S. Pat. No. 5,009,676, to Rue et al). The bond components were premixed. The grain, dextrin and an organic binder component containing a mixture consisting of 40 wt % liquid animal glue, 30 wt % powdered malic acid and 30 wt % water, and ethylene glycol, were mixed in a Hobart N-50 dough mixer (capacity of 2 Kg of mix) at low speed. The bond premixture was then added and mixed with the grain.

The mix was screened through a 18 mesh screen to break-up any lumps. The mix was then pressed into bars with dimensions of 10.16 cm×2.54 cm×1.77 cm (4"×1"×½") in a three cavity bar mold setup. Losses on ignition were calculated and specific gravity of the glass for each bond were considered in adjusting the weight percentages of the bond components used in each test sample to yield experimental abrasive tools having of glass bond component. Parts by weight of test bar mix components before firing and green densities (after pressing, pre-firing) are shown in Table 5.

TABLE 5

Composition of Test Bars (Parts by Weight)

| Components | Bond 1 | Bond 2 | Bond 3 | Bond 4 | Bond 5 | Bond 6 | Control |
|---|---|---|---|---|---|---|---|
| Abrasive | 1.0000 | 1.0000 | 1.0000 | 1.0000 | 1.0000 | 1.0000 | 1.0000 |
| Binder | .0334 | .0364 | .0314 | .0356 | .0314 | .0344 | .0324 |
| Bond | .1443 | .1468 | .1385 | .1469 | .1394 | .1438 | .1353 |
| Green Density-g/cc | 2.215 | 2.225 | 2.200 | 2.224 | 2.202 | 2.216 | 2.196 |

The bars were fired under the following conditions: at 50° C. per hour from room temperature to 350° C., held for 4 hours, then at 50° C. to 725° C. (process #1) or to 750° C. (process #2) or to 800° C. (process #3), held for 8 hours at that peak temperature, and then cooled to room temperature in a periodic kiln. Comparative sample bars were made in the periodic kiln with a Norton Company commercial bond (raw components, fired at 900° C. for 8 hours) using the mixing and molding procedure listed above.

The bars were tested for modulus of rupture on an Instron Model 1125 mechanical testing machine with a 4-point bending jig with a support span of 3", a load span of 1", and at a loading rate of 0.050" per minute cross head speed. Sand blast penetration data was generated by testing bars in a Norton Co. sandblast grading machine (#2 chamber) at 15 p.s.i. for 10 seconds. Modulus of elasticity was determined utilizing a Grindo-Sonic MK3S tester. The results (average of 6 samples) are shown in Table 6.

The test results indicate all experimental bonds had matured during firing at temperatures not exceeding 800° C. to create a bond with sufficient strength and mechanical properties to be useful in manufacturing abrasive tools suitable for grinding metal workpieces.

TABLE 6

Test Bar Strength and Hardness

| Bond: | Fired Density g/cc | Firing Temperature °C. | Modulus of Elasticity GPa | Modulus of Rupture (psi) | Sand Blast Penetration mm |
|---|---|---|---|---|---|
| Bond 1: | 2.092 | 725 | 48.35 | 7028 | 1.72 |
| Bond 2: | 2.088 | 725 | 45.58 | 4826 | 2.14 |
| Bond 3: | 2.087 | 800 | 47.87 | 6164 | 1.86 |
| Bond 4: | 2.087 | 800 | 46.77 | 5685 | 2.07 |
| Bond 5: | 2.086 | 725 | 48.63 | 6243 | 1.80 |
| Bond 6: | 2.081 | 725 | 42.85 | 5685 | 2.65 |

Process #1 for bonds 1, 2, 5 and 6, and another process, Process #3 for bonds 3 and 4 (fired at 800° C. for 8 hours), were used to make wheels with a finished size of 5×0.5×0.88 inches (12.7×1.27×2.24 cm) from experimental bonds 1–6 and the control bond. Control wheels were made utilizing a commercial bond used for MCA abrasive grain (a raw material bond described in U.S. Pat. No. 4,543,107, and fired at 900° C. for 8 hours) as described above for the test bars. The same MCA grain used in the test bars was used at 48% by volume in all wheels.

Grinding tests were conducted with these wheels utilizing the following test conditions:

Grinding Test

Grinding Machine: Heald CF#1 grinder

Wet O.D. Plunge Grinding: 5% Trim E200 water soluble oil coolant with city water Workpiece Material Ground: 52100 steel, Rc60

Workpiece Part size: 4.25 inch (10.80 cm) outer diameter

Part Speed: 150 rpm; 167 sfpm (51 smpm)

Infeed Rate into Part: 0.00016 inches/second (0.0004 cm/sec) 0.00032 inches/second (0.00081 cm/second)

Wheel Face Dressed: rotary disk CDP #6766 True at dress rate of 0.004 inch (0.01 cm)/revolution lead; 0.0005 inch (0.0013 cm) dia. depth of dress per grind Wheel Speed: 6,250 rpm; 8180 sfpm (2495 smpm)

Number of Grinds per Test: 2

Metal Removal Rates: 0.6 in3/min.in MRR, 0.240 on part diameter (3.87 cm3/min cm MRR, 0.61 cm on part diameter) 1.2 in3/min. in MRR, 0.240 inches on diameter (7.74 cm3/min cm MRR, 0.61 cm on part diameter)

Sparkout time: 5.2 seconds after each grind.

Results are shown in Table 7. Among the experimental bonds, the grinding performance, i.e., G-ratio, power drawn, grindability and surface finish parameters at a constant Metal Removal Rate (MRR), were superior to the commercial control bond wheels for bonds 1, 2 and 5. Experimental bonds 3, 4 and 6 did not show overall performance advantages over the control bond.

TABLE 7

Grinding performance

| Bond | Infeed MRR in 3/min. in | G-Ratio MRR/ WWR | Power HP/ inch | Grindability inch3/HP, min.** | Surface Finish Ra μinch | Surface Waviness μinch |
|---|---|---|---|---|---|---|
| Commercial Control | 0.573 | 202 | 10.9 | 10.61 | 35 | 60 |
|  | 1.076 | 189 | 15.4 | 13.18 | 45 | 105 |
| Exp. 1 | 0.576 | 261 | 10.3 | 14.58 | 33 | 90 |
|  | 1.060 | 196 | 14.2 | 14.74 | 38 | 70 |
| Exp. 2 | 0.576 | 242 | 9.5 | 14.68 | 35 | 90 |
|  | 1.074 | 189 | 13.8 | 14.69 | 45 | 80 |
| Exp. 3 | 0.574 | 226 | 10.3 | 12.61 | 35 | 90 |
|  | 1.077 | 179 | 14.3 | 13.47 | 45 | 130 |
| Exp. 4 | 0.572 | 226 | 10.2 | 12.68 | 38 | 85 |
|  | 1.054 | 146 | 13.9 | 11.07 | 43 | 95 |
| Exp. 5 | 0.572 | 258 | 10.0 | 14.76 | 33 | 70 |
|  | 1.076 | 179 | 14.2 | 13.55 | 40 | 80 |
| Exp. 6 | 0.571 | 165 | 9.2 | 10.22 | 40 | 120 |
|  | 1.068 | 135 | 12.5 | 11.57 | 53 | 115 |

**Grindability is equal to $\frac{\text{G-ratio} \times \text{MRR}}{\text{Power}}$.

These results indicate the grinding performance obtained by using wheels containing the experimental bonds of the invention with sol gel alumina grain was improved relative to wheels made with a commercial bond fired at 900° C. The selection of a bond formulation having a molar ratio of B2O3 to alkali oxides of about 1:1 to 1.5:1 improves grinding performance and is preferred. An increase in the Al2O3 content of the bond from 10 to 19 mole % provides no benefit in grinding.

Replacing 5 mole % SiO2 with 5 mole % CaO (Exp. 6 sample) had a mixed effect on grinding performance. Although the Exp. 6 wheel was too soft for outer diameter grinding of steel, it had appropriate mechanical properties and grinding performance for commercial use in grinding softer workpieces or workpieces requiring less aggressive metal removal rates. Thus, Exp. 6 illustrates that a molar ratio of silica to the combined contents of alkaline earth oxides and alkali oxides of at least 1.15:1.0 is preferred for typical hard metal grinding operations.

EXAMPLE 2

Processes #1 and #2 were used to make wheels (5×0.5×0.88 inch) (12.7×1.27×2.24 cm) utilizing the same volume % wheel components as used in Example 1, but using a different grain component. The wheels contained 48 volume % abrasive grain comprising a 1 to 1 mixture of filamentary seeded sol gel alumina: 38A white Alundum grain (120 grit Targa® grain and 80 grit 38A grain, manufactured by Norton Company). The percentage bond (adjusted to about 9 vol %, as in Example 1) was equivalent for all wheels and gave the same hardness grade for all wheels. The same commercial formulation used in Example 1 was tested as a control sample. Wheels were tested using the test procedures as described above for test bars. Fired density, sand blast penetration and modulus of elasticity for these wheels were measured and results are shown in Table 8.

TABLE 8

| Bond | Process Temp. °C. | Fired Density g/cc | Modulus of Elasticity GPa | Sand Blast Penetration mm |
|---|---|---|---|---|
| Commercial Control | 900° | 2.115 | 45.38 | 2.03 |
| Exp. 1 | 725° | 2.107 | 45.41 | 1.92 |
| Exp. 2 | 750° | 2.104 | 45.39 | 2.03 |
| Exp. 5 | 750° | 2.105 | 46.70 | 1.88 |
| Exp. 5 | 725° | 2.094 | 43.65 | 2.17 |

Grinding tests were conducted with these wheels utilizing the grinding test conditions of Example 1, except the following parameters were changed:

Grinding Test
Metal Removal Rates:
- 0.3 in3/min.in MRR, 0.240 inch on part diameter (1.94 cm/min cm MRR, 0.61 cm on part diameter)
- 0.6 in3/min.in MRR, 0.240 inch on part diameter (3.87 cm/min cm MRR, 0.61 cm on part diameter)
- 1.0 in3/min.in MRR, 0.240 inch on part diameter (6.45 cm/min cm MRR, 0.61 cm on part diameter)

Results are shown in Table 9. The grinding performance, i.e., G-ratio (Metal Removal Rate/Wheel Wear Rate), power drawn, grindability (G-ratio/Power×MRR) and surface finish achieved with the experimental bonds at a constant MRR, were superior to those of the commercial control bond wheels.

TABLE 9

Grinding Performance

| Bond | Infeed MRR in. 3/min inch | G-Ratio MMR/ WWR | Power Hp/ inch width | Grindability inch3/HP, min.** | Surface Finish Ra μinch | Surface Waviness Ra |
|---|---|---|---|---|---|---|
| Commercial Control | 0.28 | 125.6 | 4.8 | 7.25 | 29 | 93 |
| | 0.58 | 116.3 | 7.7 | 8.79 | 41 | 148 |
| | 0.95 | 94.8 | 10.2 | 8.76 | 65 | 164 |
| Exp. 1 725° C. | 0.29 | 158.5 | 4.6 | 9.94 | 30 | 95 |
| | 0.57 | 138.1 | 7.2 | 11.00 | 36 | 106 |
| | 0.93 | 117.1 | 8.9 | 12.17 | 46 | 142 |
| Exp. 2 750° C. | 0.29 | 156.7 | 4.7 | 9.60 | 35 | 77 |
| | 0.59 | 139.2 | 7.1 | 11.46 | 37 | 84 |
| | 0.94 | 120.8 | 9.3 | 12.23 | 51 | 151 |
| Exp. 5 750° C. | 0.29 | 156.7 | 4.7 | 9.67 | 35 | 77 |
| | 0.57 | 139.5 | 7.6 | 10.52 | 37 | 84 |
| | 0.94 | 114.6 | 9.5 | 11.40 | 51 | 151 |
| Exp. 5 725° C. | 0.29 | 149.5 | 4.5 | 9.48 | 30 | 89 |
| | 0.57 | 119.4 | 6.7 | 10.25 | 37 | 127 |
| | 0.93 | 106.9 | 9.1 | 10.96 | 53 | 173 |

**Grindability is equal to $\frac{\text{G-ratio} \times \text{MRR}}{\text{Power}}$.

EXAMPLE 3

Additional wheels were made as described in Example 2, except that a different sol gel alumina grain (alpha-alumina seeded MCA grain, 80 grit, obtained from Norton Company) was used in place of the grain blend used in Example 2. The experimental bond 1 (made by process #1, 725° C.) was compared in grinding tests to the commercial control bond tested in Examples 1 and 2 (Control 1) and to a second control bond (Control 2) described in U.S. Pat. Nos. 5,401,284 and 5,573,561, and used commercially with sol gel alumina grain. The wheels were tested as described above, and had the properties shown in Table 10.

TABLE 10

Wheel Properties

| Bond | Process Temp. °C. | Fired Density g/cc | Modulus of Elasticity GPa | Sand Blast Penetration mm 2/15 |
|---|---|---|---|---|
| Commercial Control 1 | 900° | 2.087 | 45.31 | 2.15 |
| Commercial Control 2 | 1000° | 2.085 | 48.39 | 1.93 |
| Exp. 1 | 735° | 2.081 | 47.32 | 1.83 |

Grinding test conditions were the same as those used in Example 2, except the metal removal on the diameter of the workpiece was 0.180 inch (0.46 cm).

Results are shown in Table 11. The experimental bond was superior to the commercial bonds in G-ratio, power drawn, grindability ((G-ratio×MRR)/Power), waviness and surface finish.

TABLE 11

Grinding Performance

| Bond | MRR in. 3/min inch | G-Ratio MRR/ WWR | Power Hp/ inch | Grindability inch3/HP, min.** | Surface Finish Ra μinch | Surface Waviness μinch |
|---|---|---|---|---|---|---|
| Commercial | 0.29 | 127.1 | 6.50 | 5.76 | 23 | 55 |
| Control 1 | 0.57 | 175.3 | 9.97 | 10.03 | 30 | 55 |
|  | 1.10 | 113.6 | 14.22 | 8.81 | 35 | 95 |
| Exp. 1 | 0.29 | 177.3 | 5.66 | 9.15 | 25 | 55 |
|  | 0.58 | 162.9 | 8.36 | 11.26 | 25 | 65 |
|  | 1.11 | 146.0 | 13.38 | 12.10 | 38 | 80 |
| Commercial | 0.29 | 177.3 | 6.69 | 7.68 | 25 | 50 |
| Control 2 | 0.57 | 131.4 | 10.87 | 6.91 | 35 | 105 |
|  | 1.10 | 119.4 | 16.09 | 8.18 | 40 | 95 |

**Grindability is equal to $\frac{\text{G-ratio} \times \text{MRR}}{\text{Power}}$.

EXAMPLE 4

Additional wheels were made as described in Example 1, except a variation of experimental bonds 1 and 5 were made entirely from a frit and were compared in grinding tests to the commercial control bond tested in Examples 1, 2 and 3, and to experimental bonds 1 and 5 made from raw materials as described in Examples 1 and 2. The wheels had the characteristics shown in Table 12.

TABLE 12

Wheel Properties

| Bond | Process Temp. °C. | Fired Density g/cc | Modulus of Elasticity GPa | Sand Blast Penetration mm 2/15 |
|---|---|---|---|---|
| Commercial Control 1 | 900° | 2.104 | 48.75 | 1.65 |
| Exp. 1 raw | 725° | 2.100 | 46.88 | 1.67 |
| Exp. 1 frit | 725° | 2.107 | 49.19 | 1.43 |
| Exp. 5 raw | 750° | 2.099 | 47.43 | 1.59 |
| Exp. 5 frit | 750° | 2.114 | 50.26 | 1.34 |

Grinding test conditions were the same as those used in Example 2, except the metal removal was targeted at 0.120 inch (0.31 cm) on part diameter, and the actual metal removed is shown in Table 13.

Results are shown in Table 13. The experimental bonds were either superior to, or at least equivalent to, the commercial bonds in G-ratio, power drawn, grindability, waviness and surface finish.

TABLE 13

Grinding Performance

| Bond | MRR in. 3/min inch | G-Ratio MRR/ WWR | Power Hp/ inch | Grindability inch3/HP, min.** | Surface Finish Ra μinch | Surface Waviness μinch |
|---|---|---|---|---|---|---|
| Commercial | 0.36 | 121.9 | 5.5 | 6.91 | 29 | 55 |
| Control 1 | 0.55 | 107.2 | 7.3 | 7.50 | 33 | 79 |
|  | 1.10 | 94.6 | 10.0 | 9.52 | 42 | 101 |
| Exp. 1 raw | 0.36 | 125.5 | 4.7 | 8.09 | 32 | 81 |
|  | 0.54 | 128.5 | 6.3 | 9.92 | 36 | 87 |
|  | 1.12 | 99.6 | 9.2 | 11.45 | 35 | 79 |
| Exp. 1 frit | 0.38 | 113.3 | 5.6 | 6.74 | 29 | 74 |
|  | 0.55 | 101.1 | 7.2 | 7.03 | 35 | 95 |
|  | 1.10 | 91.8 | 10.5 | 9.03 | 39 | 76 |
| Exp. 5 raw | 0.37 | 143.8 | 4.8 | 10.25 | 29 | 75 |
|  | 0.56 | 118.0 | 6.1 | 9.80 | 31 | 75 |
|  | 1.09 | 104.6 | 9.3 | 11.25 | 41 | 89 |
| Exp. 5 frit | 0.36 | 122.1 | 5.5 | 6.88 | 31 | 76 |
|  | 0.55 | 103.9 | 6.4 | 7.63 | 32 | 73 |
|  | 1.07 | 90.3 | 9.9 | 8.90 | 37 | 63 |

**Grindability is equal to $\frac{\text{G-ratio} \times \text{MRR}}{\text{Power}}$.

The fritted bond wheels were equivalent in overall performance to the commercial control bond, but, in general, did not perform as well in this grinding test as the wheels made from the corresponding raw bonds. This may be due to loss of volatile lithium and boron components from the composition during the fritting process (frits were formed at temperatures of at least 1100° C.) such that the chemistry of the fritted bond differed from that of the raw material bond. Compensation for loss of relatively volatile components could be made by adjusting the weight percentage of raw materials used in making the glass frit to yield the desired final bond chemistry. Thus, a fritted bond may be used to carry out the invention.

Wheels made from raw bond components were again superior in grinding performance to a commercial control fired at a higher temperature.

EXAMPLE 5

Abrasive wheels (29 mm×20 mm×9.525 mm) were made as described in Example 1 using Exp. Bond 1 fired at 735° C. and commercial Control bond 2 fired at 1000° C., respectively, except that an unseeded sol gel MCA abrasive grain (100 grit) made by 3M Corporation, Minneapolis, Minn., and sold under the 321 tradename, was used in place of the seeded MCA abrasive grain. Wheel compositions used and wheel properties are listed in Tables 14 and 15. These wheels were compared to a commercial wheel (29 mm×20 mm×10 mm) made with 100 grit size 321 abrasive grain in a vitrified bond (Control 3).

TABLE 14

Pre-fired Composition of Wheels (Parts by Weight)

| Components | Exp. Bond 1 | Control 2 |
|---|---|---|
| Abrasive | 1.0000 | 1.0000 |
| Organic Binder | 0.0487 | 0.0500 |
| Bond | 0.1068 | 0.0918 |
| Green Density g/cc | 2.051 | 2.027 |

TABLE 15

Wheel properties*

| Sample: Bond Fired Density g/cc | Firing Temperature °C. | Modulus of Elasticity GPa | Sand Blast Penetration mm |
|---|---|---|---|
| Exp. Bond 1: 1.943 | 735 | 23.69 | 3.98 |
| Control 2: 1.946 | 1000 | 24.69 | 4.07 |
| Control 3: 2.052 | unknown | 35.23 | — |

*Data are an average of five wheels for Exp. 1 and Control 2 and an average of two wheels for Control 3.

Two sets of these wheels were tested in an ID/bore grinding apparatus using test conditions listed below. Results of the first test and the replicate test are shown in Table 16.

Grinding Test

Grinding Machine: Bryant grinder

Wet I.D. Grinding: 3% Trim E210 water soluble oil coolant with city water

Workpiece Material Ground: 52100 steel, Rc60

Workpiece Part Width: 9.525 mm

Workpiece Part Diameter: 32 mm (first test) 35 mm (second test)

Part Speed: 1000 rpm

Total Infeed into Part: 1.499 mm

Wheel Face Dressed: Single point diamond; True at dress rate of 20 mm/sec dress lead; 0.0127 mm dress comp Wheel Speed: 29,200 rpm; 42.7 M/sec Number of Grinds per Test: 2

Infeed per Grind: 0.025 mm/sec; 0.049 mm/sec.

TABLE 16

Grinding Performance

| Bond | Infeed Rate mm/s | G-Ratio MRR/WWR | Power W/mm | Tangential Force F'T N/mm | Specific Energy Watts sec/mm3 | Grindability mm3/ Watts · sec | Surface Finish Ra μm |
|---|---|---|---|---|---|---|---|
| Commercial | 0.025 | 340.0 | 122 | 2.83 | 48.61 | 6.99 | 0.50 |
| | 0.049 | 341.5 | 181 | 4.21 | 36.16 | 9.45 | 0.51 |
| Control 2* | 0.025 | 197.0 | 126 | 2.98 | 50.35 | 3.91 | 0.38 |
| | 0.049 | 172.3 | 183 | 4.37 | 36.93 | 4.67 | 0.53 |
| Exp. Bond 1 | 0.025 | 327.4 | 118 | 2.69 | 47.80 | 6.85 | 0.43 |
| | 0.049 | 331.8 | 181 | 4.14 | 36.38 | 9.12 | 0.47 |
| | 0.025 | 204.5 | 108 | 2.56 | 41.73 | 4.90 | 0.53 |
| | 0.049 | 183.9 | 164 | 3.94 | 31.22 | 5.89 | 0.64 |
| Commercial | 0.025 | 335.0 | 130 | 3.05 | 53.09 | 6.31 | 0.35 |
| | 0.049 | 266.8 | 206 | 4.85 | 42.34 | 6.30 | 0.47 |
| Control 3* | 0.025 | 208.1 | 133 | 3.17 | 50.70 | 4.11 | 0.40 |
| | 0.049 | 183.8 | 181 | 4.35 | 34.49 | 5.33 | 0.53 |

*comparable overall performance to that of control 2 bond fired at 1000° C. and the commercial wheel Control 3.

Furthermore, the wheels containing the experimental bond of the invention were sharper acting than the controls. This is evident from data showing that tangential force required to achieve comparable metal removal rates was less for the experimental bond of the invention than for the control bonds in all samples except one. The exception was for the Control 2 bond which was comparable to the experimental bond in one run at 0.049 MRR. As another measure of wheel sharpness, the specific energy (Power/MRR) required to achieve comparable metal removal rates was less, on average, for the experimental bond of the invention than for the control bonds. For the operator of a grinding process the lowered tangential force and lowered specific energy represent less wear on a grinding machine and less damage to a workpiece and, thus, can be as beneficial as improved grindability.

These results demonstrate the low temperature firing bond of the invention improves grinding performance of unseeded, as well as seeded, sol gel MCA abrasive grain.

It is understood that various other modifications will be apparent to and can be readily made by those skilled in the art without departing from the scope and spirit of the present invention. Accordingly, it is not intended that the scope of the claims be limited to the description set forth above. The claims should be construed as encompassing all of the features of patentable novelty which reside in the present invention, including all features considered by those skilled in the art to be equivalents thereof.

We claim:

1. An abrasive tool comprising MCA abrasive grain and a vitreous bond, wherein the vitreous bond after firing comprises a maximum of about 45 mole % $SiO_2$, a maximum of about 15 mole % $Al_2O_3$, from about 24 to about 35 mole % $B_2O_3$, and from about 15 to about 30 mole % of alkali oxides, the alkali oxides comprising at least 5 mole %, on a bond basis, of lithium oxide, and the molar ratio of $B_2O_3$ to alkali oxides is from 0.8:1 to 1.7:1.

2. The abrasive tool of claim 1, wherein the vitreous bond after firing comprises a maximum of 40 mole % $SiO_2$.

3. The abrasive tool of claim 2, wherein the vitreous bond after firing comprises alkaline earth oxides and the molar ratio of $SiO_2$ to the combined contents of alkali oxides and alkaline earth oxides is at least 1.15:1.0.

4. The abrasive tool of claim 1, wherein the alkali oxides further comprising sodium oxide and the vitreous bond after firing comprises 7 to 11 mole % lithium oxide.

5. The abrasive tool of claim 1, wherein the vitreous bond is fired at 600°–875° C.

6. The abrasive tool of claim 5, wherein the vitreous bond is fired at 700°–800° C.

7. The abrasive tool of claim 1, wherein the tool comprises 3 to 25 volume % vitrified bond and 10 to 56 volume % MCA abrasive grain.

8. The abrasive tool of claim 7, wherein the tool further comprises about 0.1 to about 60 volume % of additional components selected from the group consisting of secondary abrasive grains, fillers and adjuncts.

9. The abrasive tool of claim 8, wherein the tool comprises a total of 34 to 56 volume % abrasive grain.

10. The abrasive tool of claim 1, wherein the MCA abrasive grain consists essentially of alpha-alumina microcrystals manufactured by a seeded sol-gel process.

11. The abrasive tool of claim 1, wherein the MCA abrasive grain consists essentially of alpha-alumina microcrystals manufactured by an unseeded sol-gel process.

12. The abrasive tool of claim 1, wherein the vitreous bond after firing further comprises less than about 0.5 mole % of at least one oxide selected from the group consisting of $TiO_2$, ZnO, $ZrO_2$, CaO, MgO, CoO, MnO2, BaO, Bi2O3, P2O5 and $Fe_2O_3$, and combinations thereof.

13. A vitreous bond for manufacture of an abrasive grinding tool, comprising after firing less than about 45 mole % $SiO_2$, a maximum of about 15 mole % $Al_2O_3$, from about 24 to about 35 mole % $B_2O_3$, from about 15 to about 30 mole % of alkali oxides, the alkali oxides comprising at least 5 mole %, on a bond basis, of lithium oxide, and having a molar ratio of $B_2O_3$ to alkali oxides of 0.8:1 to 1.7:1.

14. The abrasive tool of claim 13, wherein the vitreous bond after firing comprises a maximum of 40 mole % $SiO_2$.

15. The abrasive tool of claim 14, wherein the vitreous bond after firing further comprises alkaline earth oxides and the molar ratio of $SiO_2$ to the combined contents of alkali oxides and alkaline earth oxides is at least 1.15:1.0.

16. The abrasive tool of claim 14, wherein the alkali oxides further comprising sodium oxide and the vitreous bond after firing comprises 7 to 11 mole % lithium oxide.

17. The abrasive tool of claim 14, wherein the vitreous bond is fired at 600°–875° C.

18. The abrasive tool of claim 17, wherein the vitreous bond is fired at 700°–800° C.

19. A method for making an abrasive tool, comprising the steps of:

a) mixing about 70 to 95 weight % abrasive grain, said abrasive grain comprising at least 5 volume % MCA and about 5 to 30 weight % bond mixture, the bond mixture comprising after firing less than about 45 mole % $SiO_2$, a maximum of about 15 mole % $Al_2O_3$, from about 24 to about 35 mole % $B_2O_3$, from about 15 to about 30 mole % of alkali oxides, the alkali oxides comprising at least 5 mole %, on a bond basis, of lithium oxide, and having a molar ratio of $B_2O_3$ to alkali oxides of 0.8:1 to 1.7:1, to form a mixture;

b) molding the mixture into a green composite; and c) firing the green composite at a temperature less than 875° C. to form the abrasive tool.

20. The method of claim 19, wherein the green composite is fired at a temperature less than about 775° C.

21. The method of claim 19, wherein the abrasive tool is a grinding wheel.

22. The method of claim 19, wherein the abrasive grain further comprises a superabrasive selected from the group consisting of diamond, cubic boron nitride, and mixtures thereof.

23. The method of claim 19, wherein the firing step is carried out in an oxidizing atmosphere.

* * * * *